(12) United States Patent
Osumi et al.

(10) Patent No.: US 6,846,528 B2
(45) Date of Patent: Jan. 25, 2005

(54) TRANSLUCENT DECORATIVE BOARD

(75) Inventors: Shiro Osumi, Ogai (JP); Shigeru Sugiyama, Ogaki (JP); Takahiro Uno, Ogaki (JP); Kazuo Yoneyama, Ogaki (JP)

(73) Assignee: Ibiden Co., Ltd., Gifu (JP)

( * ) Notice: Subject to any disclaimer, the term of this patent is extended or adjusted under 35 U.S.C. 154(b) by 0 days.

(21) Appl. No.: 09/979,466

(22) PCT Filed: Mar. 26, 2001

(86) PCT No.: PCT/JP01/02421
§ 371 (c)(1),
(2), (4) Date: Feb. 25, 2002

(87) PCT Pub. No.: WO01/70496
PCT Pub. Date: Sep. 27, 2001

(65) Prior Publication Data
US 2003/0091758 A1 May 15, 2003

(30) Foreign Application Priority Data

| Mar. 24, 2000 | (JP) | 2000-083976 |
| Apr. 28, 2000 | (JP) | 2000-130769 |
| Jul. 10, 2000 | (JP) | 2000-208385 |
| Sep. 22, 2000 | (JP) | 2000-288209 |
| Dec. 27, 2000 | (JP) | 2000-397245 |

(51) Int. Cl.$^7$ .......... B32B 3/00; B32B 29/02; B44F 1/06; E06B 3/24
(52) U.S. Cl. .......... 428/34; 428/38; 428/211; 428/172; 428/292.7; 442/59; 442/181
(58) Field of Search .......... 428/211, 261, 428/172, 34, 38, 292.7, 141, 204; 442/59, 181

(56) References Cited

U.S. PATENT DOCUMENTS

| 4,789,604 A | * 12/1988 | van der Hoeven .......... 428/503 |
| 4,853,276 A | * 8/1989 | Kurushima .................. 428/187 |
| 4,881,999 A | * 11/1989 | Balmer et al. .............. 156/231 |
| 5,047,282 A | 9/1991 | Mier |
| 5,169,704 A | * 12/1992 | Faust et al. ................. 428/143 |
| 5,258,235 A | 11/1993 | Mehta et al. |
| 6,025,069 A | 2/2000 | Eckart et al. |
| 6,093,473 A | * 7/2000 | Min .......................... 428/147 |
| 6,212,805 B1 | * 4/2001 | Hill ............................ 40/443 |
| 6,428,875 B1 | * 8/2002 | Takahashi et al. .......... 428/172 |

FOREIGN PATENT DOCUMENTS

| EP | 0 249 583 A1 | 12/1987 |
| EP | 0 988 967 A1 | 3/2000 |
| JP | 77006671 B | 2/1977 |
| JP | 09-277449 | 10/1997 |
| WO | WO 89/10260 | 11/1989 |

* cited by examiner

*Primary Examiner*—Rena Dye
*Assistant Examiner*—L. Ferguson
(74) *Attorney, Agent, or Firm*—Neal, Gerber & Eisenberg, LLP

(57) ABSTRACT

A translucent decorative board for use, e.g., as a window pane, light shade, partition or door pane is disclosed. The decorative board is comprised of a translucent substrate board and translucent cover sheets bonded to the surfaces of the substrate board. The substrate board is generally thermoplastic and the decorative cover sheets are thermosetting. The thermosetting sheet may comprise a substrate paper sheet and a thermosetting resin impregnated in the sheet.

9 Claims, 15 Drawing Sheets

Fig. 11
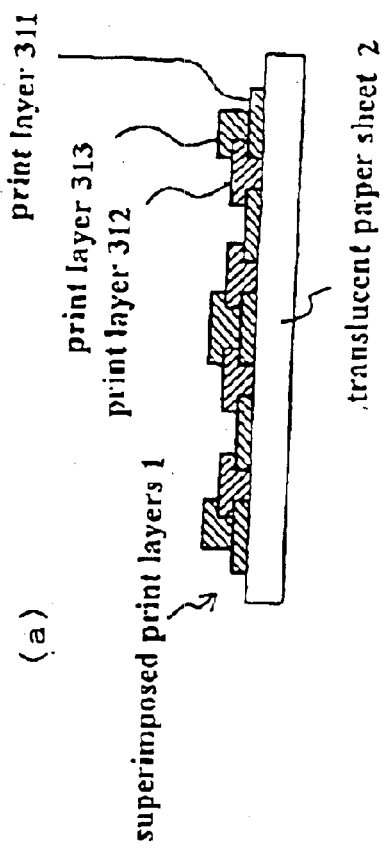
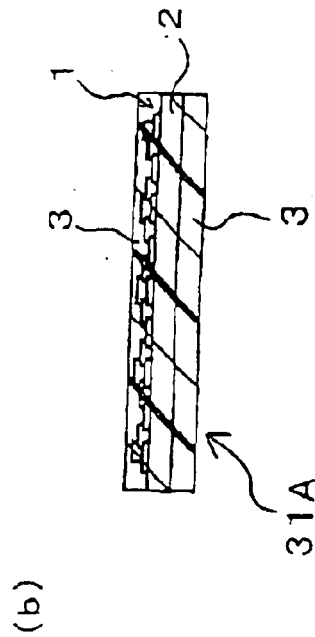
(a) superimposed print layers 1 — print layer 311, print layer 313, print layer 312, translucent paper sheet 2
(b)
Fig. 10
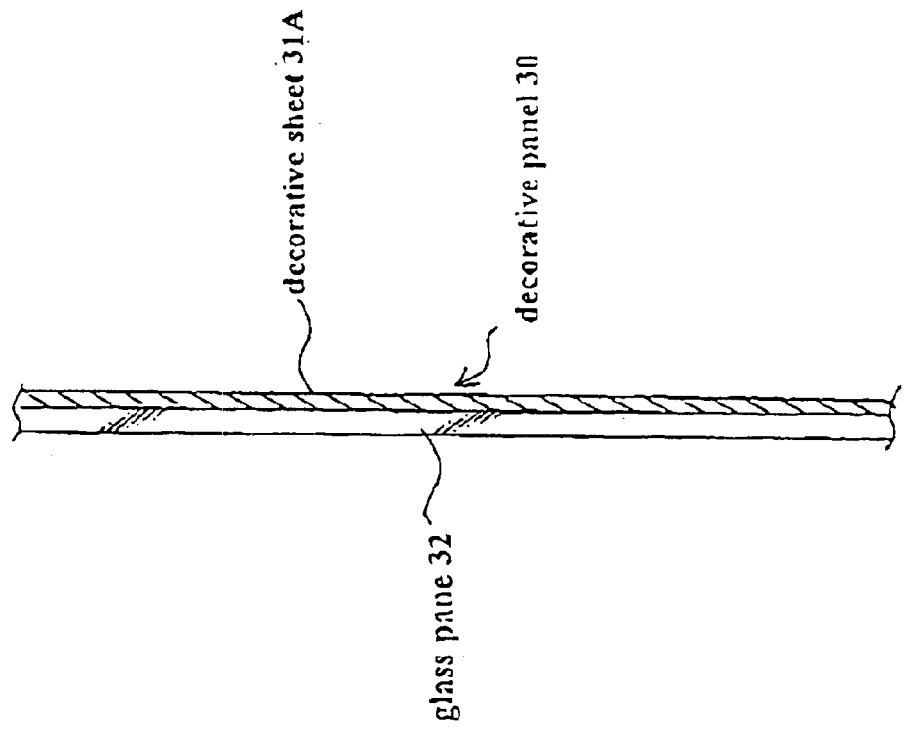
decorative sheet 31A
decorative panel 30
glass pane 32

Fig. 14
(a)
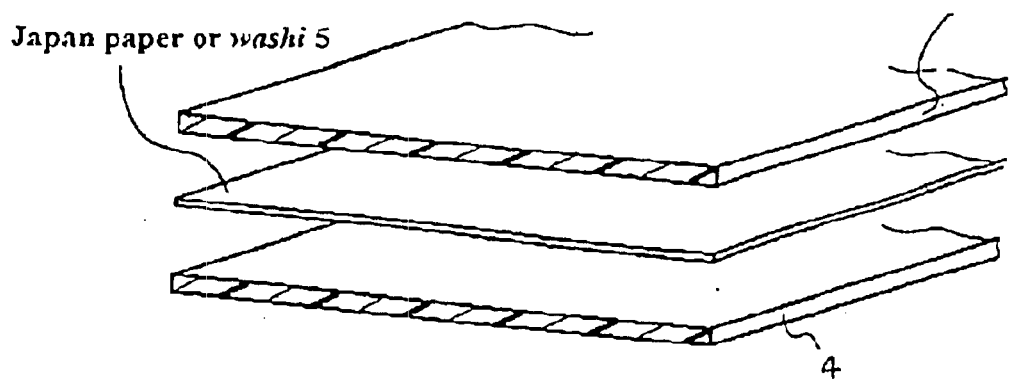
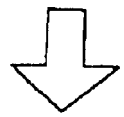
(b)
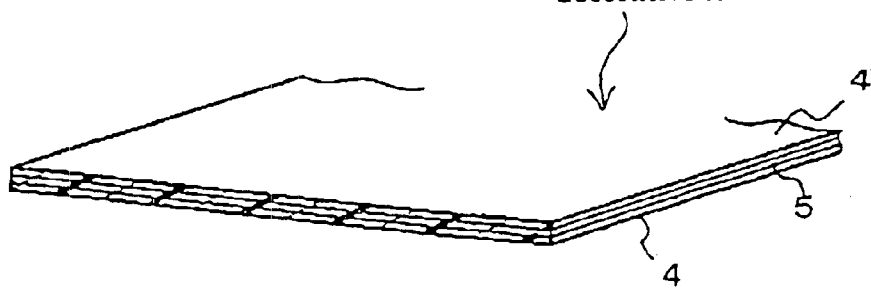

Fig. 15
(a)
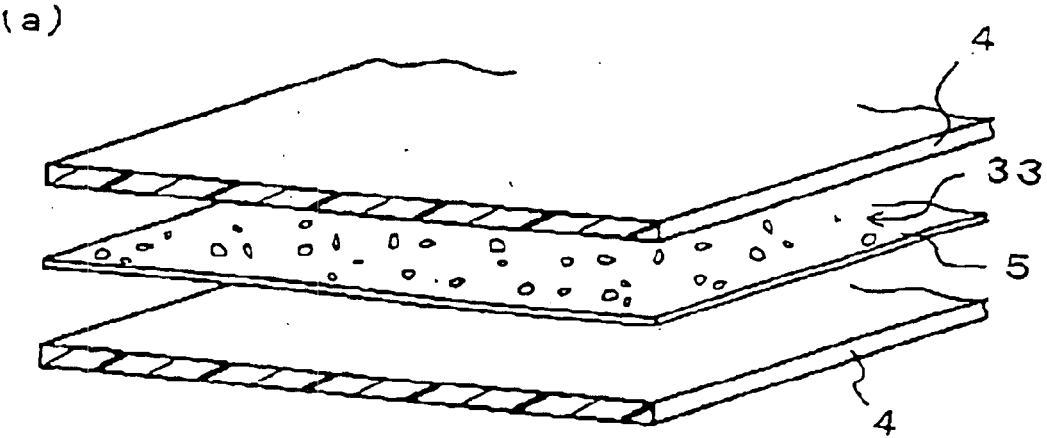
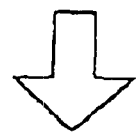
(b)
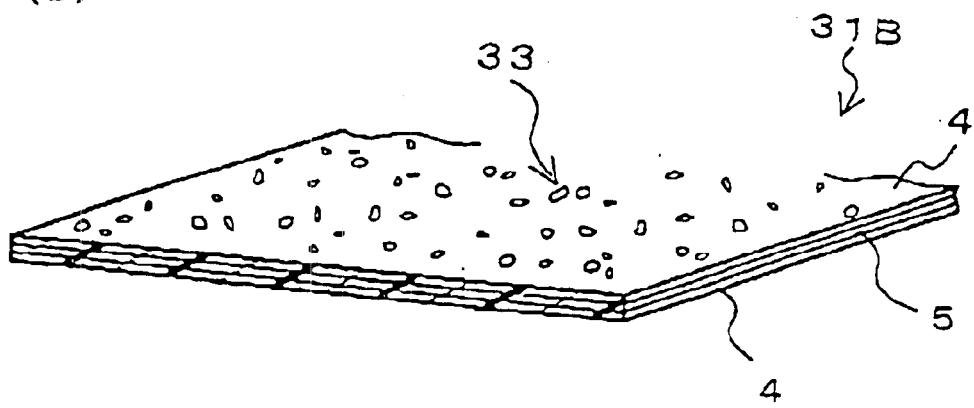

Fig. 18
(a)
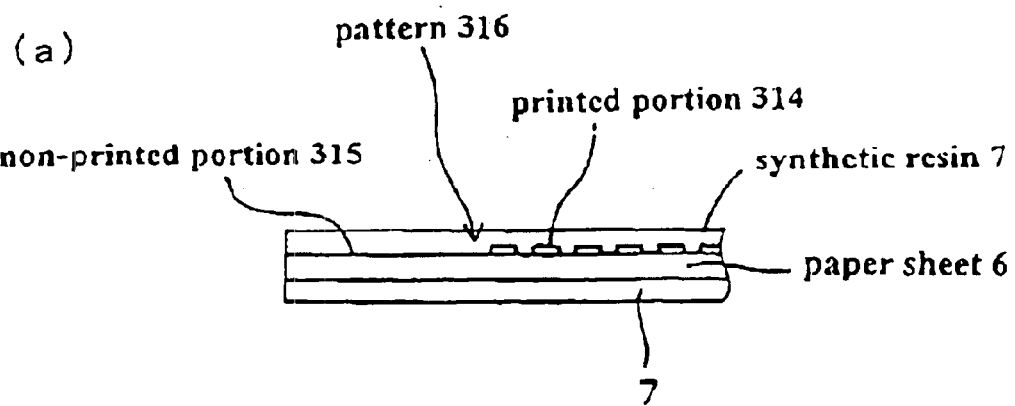
(b)
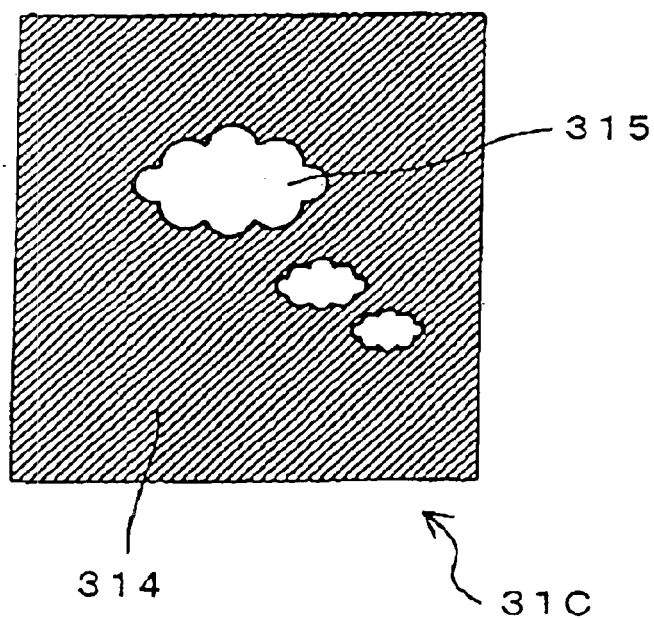

Fig. 19
(a)
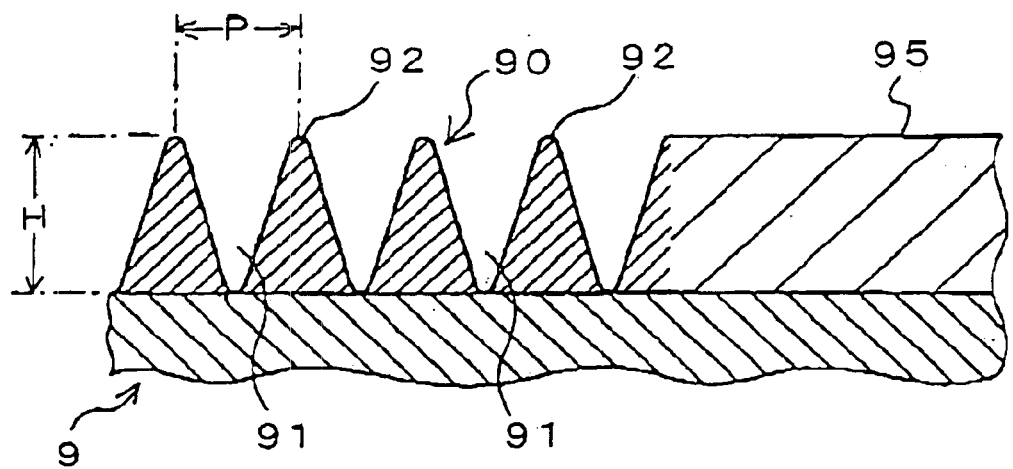
(b)
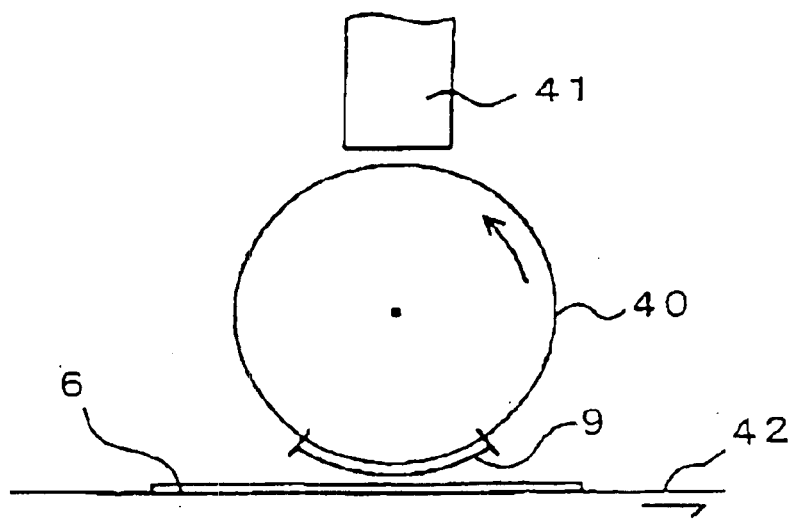

TRANSLUCENT DECORATIVE BOARD

FIELD OF THE INVENTION

This invention relates to a translucent decorative board or pane for use, e.g., as a translucent or semitransparent partition panel, table top, door panel, window pane or illuminator screen, e.g., in a restaurant, hotel, department store, hospital, office or house.

BACKGROUND ART

Decorative boards or panels are conventionally used as interior baseboards, wainscots, decoration panels, etc. Conventionally there is a decorative board comprising a plastic (such as acrylic or polyvinyl chloride) substrate and a patterned paper or sheet, which are thermo-compression bonded together. Such conventional boards provide certain optical transmittance and are widely used, e.g., as flooring, ceiling, wall or light shielding materials. There is also a glass board for use, e.g., as a table top or shelf board, comprising a plastic film and a solid or thick (often as thick as 5 mm or over) glass board, which are bonded together.

A relatively fragile conventional decorative board is liable to cracking or flaws and therefore generally unfit for use as a shelf board or table top which requires considerable resistance against physical shocks and/or pressing force. A relatively solid and sturdy conventional glass board comprising a glass board and a plastic film is relatively hard to process such as cutting and often excessively heavy to handle.

Accordingly, it is a "first" object of the present invention to provide a decorative board which is translucent or semitransparent, lighter than glass, easy to process, resistant to cracking and flawing, and excellent in overall mechanical properties.

A single-color board is disclosed in JP Patent Publication No. 5-39187, which comprises a substrate board containing a polymeric pigment, which is sandwiched by identically colored sheets. This decorative board material is not sufficiently translucent and thus is not particularly suitable for use against a light source.

The inventors of the present invention originally aimed at providing a translucent or semi transparent decorative board by directly coloring a polymeric substrate. However, such a translucent decorative board posed a number of problems. Some of the major problems are a) difficulty in controlling colors; b) relatively limited colors as a result of manufacturing restrictions; c) requirement of a large manufacturing plant; d) relatively low productivity; e) unfitness for small quantity production; and f) relatively poor mechanical properties.

Accordingly, it is a "second" object of the present invention to provide an "evenly-colored" decorative board which can be economically produced even in a small quantity, where its transparent substrate and colored cover layers together provide an "illusion" of an evenly colored board.

There also conventionally exists a translucent (semitransparent) decorative board for use as a window pane, door board or illumination shade, comprising a transparent substrate such as a glass board and a colored or patterned fabric or plastic sheet bonded to the transparent substrate. Such a conventional decorative board is short of providing "special" effects or satisfactory transparency.

Accordingly, it is a "third" object of the present invention to provide a decorative board or pane which provides "fancy" transparency or translucency as well as soothing effects on viewers' mental states.

Other objects of the present invention will become apparent from the following descriptions.

SUMMARY OF THE INVENTION

The present invention is summarized hereunder using the drawings which accompany the specification, which will facilitate easy understanding of the present invention by the readers.

A translucent decorative board of the present invention comprises a translucent thermoplastic board and a translucent thermosetting sheet or sheets bonded to a surface or surfaces of the thermoplastic substrate board.

FIG. 1 shows a decorative board 10 according to an embodiment of the present invention comprising a translucent thermoplastic substrate board 12 (which is considerably lighter and easier to process than a glass board), and translucent thermosetting sheets 11,13, whose surfaces are harder than the surfaces of the thermoplastic board 12. The thermosetting sheets 11,13 sandwich the thermoplastic board 12 as shown in FIG. 1. A suitable translucent polymeric material for the thermoplastic board 12 may be an acrylic resin, polyvinyl chloride resin, polycarbonate resin, polyethylene phthalate resin or olefin resin. Preferably, the thickness of the thermoplastic substrate board 12 is 1 mm to 30 mm.

The modifiers "transparent" and "translucent" as used herein are sometimes interchangeable. The terms "translucency" and "transparency" as used in this specification are meant to provide an optical transmittance of "10% or greater" (JIS K7105: Japanese Industrial Standard). An optical transmittance of "10% to 50%" is particularly preferred for the "translucency" of the present invention.

Polymeric or resin materials for the thermosetting sheets 11,13 may be selected from the polymer or resin group consisting of melamine resin, diallylphthalate resin, unsaturated polyester resin and polyurethane resin. These resin materials generally provide translucency, light resistance, surface hardness and resistance to flaws.

It is preferred that the thermosetting sheets 11,13 each comprise a fibrous substrate or paper substrate where a thermosetting polymeric material is impregnated, which is chemically resistant and stain resistant. It is preferred that the fibrous or paper substrate is a translucent sheet or paper containing less than 1% ash or a concealed paper which may contain more than 1% ash. Generally, it is preferred that the ash content of the substrate board is below 5%. If the ash content is over 5%, the optical transmittance of the decorative board of the present invention will become "poor" or less than the desired 10%.

The thermosetting sheets 11,13 may each comprise a woven or nonwoven fibrous substrate sheet of inorganic or organic fibers, in which a thermosetting resin is impregnated. This construction provides an excellent tensile strength and resistance against stretching or shrinkage, which assists in providing the decorative board product of the present invention with excellent tensile strength, modulus of elasticity, dimensional stability and impact resistance.

The decorative board incorporating such thermosetting sheets can be subjected to drilling and/or punching processes without cracking or chipping, capable of accepting use of a screw or bolts without damages thereto.

The inorganic fibers may be selected from the fiber group consisting of glass fibers, carbon fibers and ceramic fibers.

They provide the thermosetting sheets 11,13 with excellent tensile strength and resistance against stretching, providing the decorative board of the present invention with excellent modulus of elasticity and resistance against bending.

The organic fibers may be selected from the fiber group consisting of polyester fibers, nylon fibers, rayon fibers, acrylic fibers, vinylon fibers, polyethylene fibers, polypropylene fibers, cotton fibers, silk fibers, wool fibers, bast fibers, and pulp fibers. They provide the thermosetting sheets with excellent physical toughness, providing the decorative board of the present invention with excellent impact resistance.

Japanese Patent Laid-Open Publication No. 11-291423 teaches a decorative board comprising a polyolefin plate containing inorganic particles and a protection sheet bonded to the polyolefin plate. This decorative board does not provide satisfactory strength nor workability, totally lacking in optical transmittance.

The thermoplastic board 12 and the thermosetting sheets 11,13 can be bonded together, e.g. through the following processes to provide a decorative board 10 of the present invention.

One bonding method comprises forming thermosetting sheets 11,13 by thermo-compression forming means, and respectively bonding the thermosetting sheets 11,13 onto both surfaces of a thermoplastic board 12 with an adhesive. The adhesive should be transparent and light resistant. A polyurethane adhesive can be advantageously used. In order to provide good adhesion, the thermoplastic board 12 may be surface treated to provide good wettability, e.g., by corona discharge means or plasma discharge means.

Another bonding method comprises preparing prepregs or composite polymeric layers by impregnating an appropriate thermosetting resin into a plurality of substrates prepared of inorganic or organic fabrics (woven or nonwoven fabrics) or paper, and thermo-compress the layered prepregs on both surfaces of the thermoplastic board 12, preferably using hot-cold press means. The hardening temperature of the thermosetting resin must be equal to or below the softening temperature of the thermoplastic board 12. The adjustment of the hardening temperature of the preregs may be made by selective use of hardening agents.

In order to achieve the "second" object of the present invention which is set forth earlier, a translucent substrate board is sandwiched by translucent decorative surface sheets so as to look "colored" or "patterned" similarly or identically with the surface sheets. In other words, the decorative board produces an illusion that the transparent substrate board is also "similarly colored."

The wording "similarly colored" as used herein is in accordance with the color dictionary entitled "Dictionary of Colors" published by Japan Color Research Center/Japan Color Research Company (1st edition/Sep. 15, 1973), which divides colors into sixteen(16) basic similarity blocks.

The "second" object of the present invention is achieved by provision of a decorative board 20 as shown in FIG. 7, which comprises a translucent substrate board 22 whose both surfaces are covered with translucent decorative sheets 21,23. The decorative sheets 21 and 23 preferably possess an identical color or similar color. The light or ray coming at an angle onto and into the decorative board 20 partially reflects on the outer surface of the decorative sheet 21 and on the inner surface of the other decorative sheet 23 as schematically shown in FIG. 7, "carrying out" the color where they reflect, providing a phantom impression or look that the translucent substrate board 22 is also colored identically or similarly.

The decorative sheets 21,23 may be alternatively or additionally provided with an identical colored pattern, in which case, the translucent substrate board 22 provides a phantom impression that the substrate board 22 is patterned identically with the decorative sheets 21,23.

The translucent substrate board 22 may be prepared of acrylic resin, polyvinyl chloride resin, polycarbonate resin, polyethylene terephthalate resin or olefin resin. In an embodiment, the higher the optical transmittance, the better for the substrate board 22. Preferably, the optical transmittance of the substrate board is greater than 10%. It is preferred that the thickness of the substrate board 22 is 1 mm to 20 m. The substrate board 22 maybe a glass board pane.

The decorative sheet 21,23 may be provided as a paint layer, print layer, colored film, decorative paper or colored facing layer which possesses a degree of translucency (optical transmittance of 10% or greater). It is advantageous that the decorative sheets 21,23 are a polymer impregnated sheet since a resin impregnate sheet provides excellent impact resistance, flaw resistance and bend resistance.

The resin material which may be advantageously impregnated in the substrate sheet material for the decorative sheets 21,23 may be selected from the translucent thermosetting resin group consisting of melamine resin, epoxy resin, phenol resin, diallylphthalate resin and unsaturated polyester resin.

The substrate sheet material of the decorative sheets 21,23 may be an organic or inorganic fabric sheet or paper. The organic fibers may be polypropylene fibers, polyester fibers or alamido fibers. The inorganic fibers may be glass fibers, alumina fibers or silica fibers. The substrate sheet material may be printed with an attractive pattern in color or colors. The decorative sheets 22,23 may each be covered with a hard type plastic cover layer for protection of the surfaces of the decorative sheets 21,23.

The "third" object of the present invention is achieved by the following structural constitution which provides an integrated translucent decorative board, comprising a translucent glass or plastic pane and a translucent decorative panel, which are secured to each other. Such a decorative board may be advantageously used as a window pane and produces a visionary interior atmosphere.

The translucent decorative panel for the glass-type decorative board of the present invention may be provided through the steps of forming a plurality of partially overlapping print layers on a translucent paper sheet, and impregnating a thermosetting resin in the paper sheet together with the print layers provided thereon. The plurality of partially overlapping print layers may be advantageously provided by printing micro-sized color dots.

As set forth, the translucent paper sheet having partially overlapping print color dots is impregnated with a translucent type of thermosetting resin to provide a translucent decorative panel which renders the color dots underneath the translucent resin to be seen through.

Such partially superimposed color dots may be advantageously provided by silk screening means. Silk screening processes are repeated as many times as desired to provide partially superimposed dots of different colors on the translucent substrate paper. The partially superimposed dots of different colors will provide an attractive and fancy color appearance. The decorative board of the present invention integrating such a decorative panel on a translucent glass or glass-like board can provide a unique and visionary appearance when light from a light source such as the sun pours through the translucent decorative board.

A Japan paper sheet or "washi" which itself provides a unique and tasteful pleasure and is excellent in mechanical properties may be impregnated with a translucent thermosetting resin and additionally used between two translucent resin impregnated paper sheets. The Japan paper sheet when impregnated with a translucent type resin will itself become translucent. Japan paper can be easily and directly colored or provided with a colored design pattern during its traditional unique manufacturing processes, which provides the decorative board of the present invention with an additional special taste that other materials cannot and will eliminate subsequent printing processes.

The glass-type decorative board of the present invention may alternatively comprise a glass pane and a translucent decorative panel provided separately, the decorative panel being secured to the glass pane with suction cups as shown in FIGS. 20 and 21.

Another glass-type of a decorative board may comprise a decorative sheet which is patterned with printed patches or spots and impregnated with a thermosetting resin. The printed patches provide shade images while other portions (non-printed portions) provide relatively bright images, creating a tasty and fancy contrasting image.

When the decorative board is used as a window pane of a house room or hotel lounge, the house room or hotel lounge will be provided with a unique visionary atmosphere.

BRIEF DESCRIPTION OF THE DRAWINGS

FIG. 10 is a sectional view of the decorative board of FIG. 9;

FIG. 11(a) is a micrographical sectional representation which schematically shows superimposed print dots on a translucent substrate sheet according to Embodiment 3(1) of the present invention;

FIG. 11(b) is a sectional representation which shows another decorative sheet according to Embodiment 3(1) of the present invention;

FIG. 14(a) is a perspective view showing a manufacturing process of a decorative board according to Embodiment 3(2) of the present invention;

FIG. 14(b) is a perspective view showing the completed state of the decorative board of FIG. 14(a);

FIG. 15(a) is a perspective view showing a manufacturing step of another decorative board according to Embodiment 3(2) of the present invention;

FIG. 15(b) is a perspective view showing the completed state of the decorative board of FIG. 15(a);

FIG. 18(a) is a sectional view of a decorative board according to Embodiment 3(3) of the present invention;

FIG. 18(b) is a plan view of the decorative board of FIG. 18(a);

FIG. 19(a) is a micrographic representation which schematically shows a gravure printing step for a decorative board according to Embodiment 3(3) of the present invention;

FIG. 19(b) schematically shows a manufacturing process of the decorative board of FIG. 19(a);

DEFINITION OF THE NUMERALS USED

Figure 1:
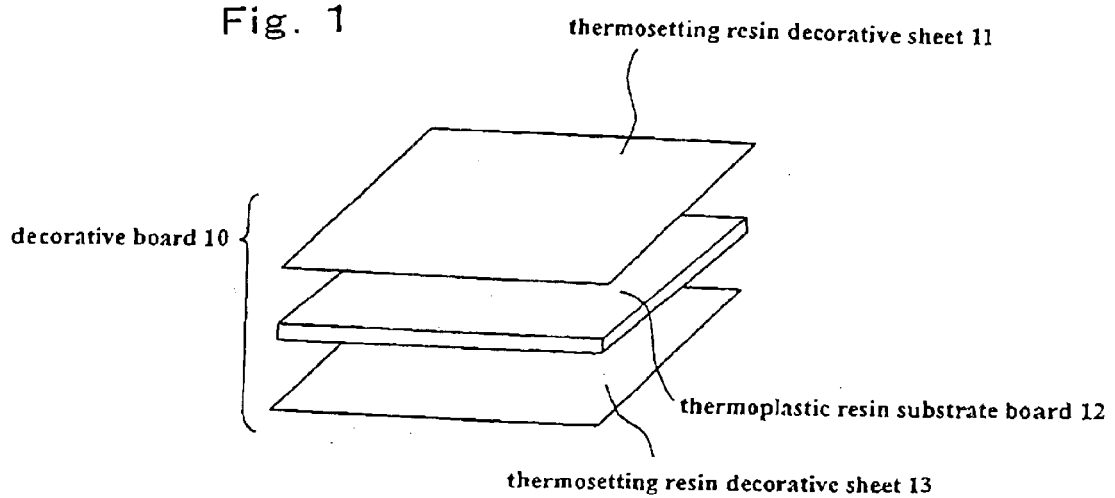
FIG. 1 is a perspective view of a decorative board according to Embodiment 1(1) of the present invention.
Figure 2:
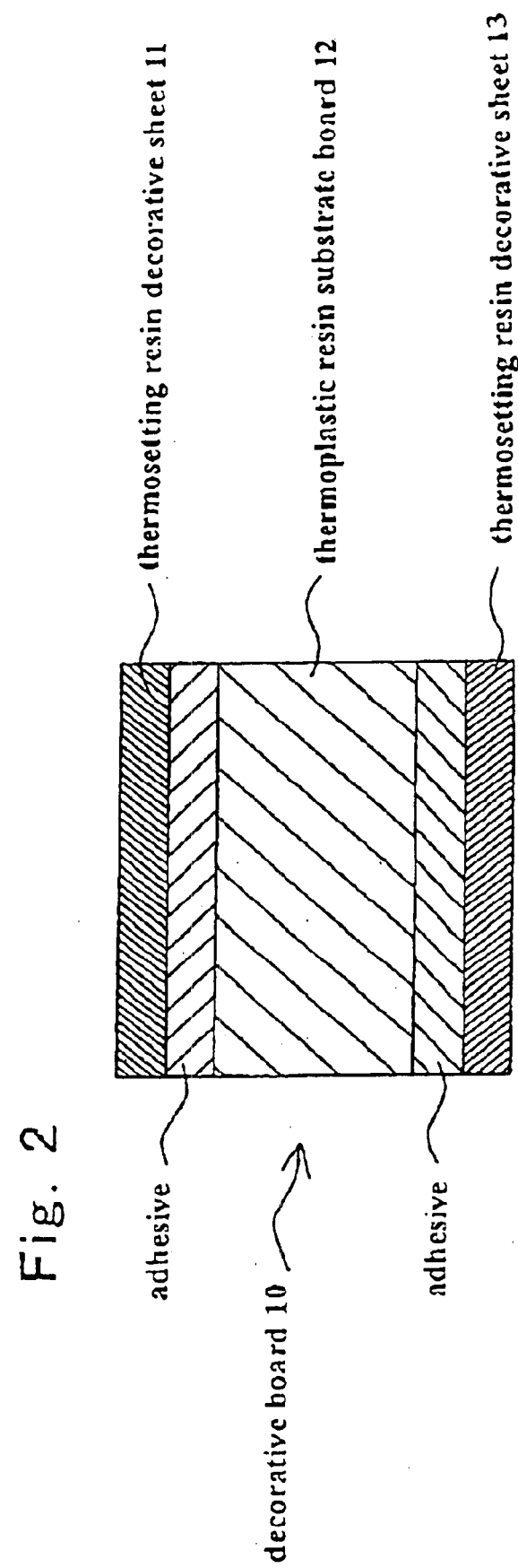
FIG. 2 is a sectional view of the decorative board of FIG. 1.
Figure 3:
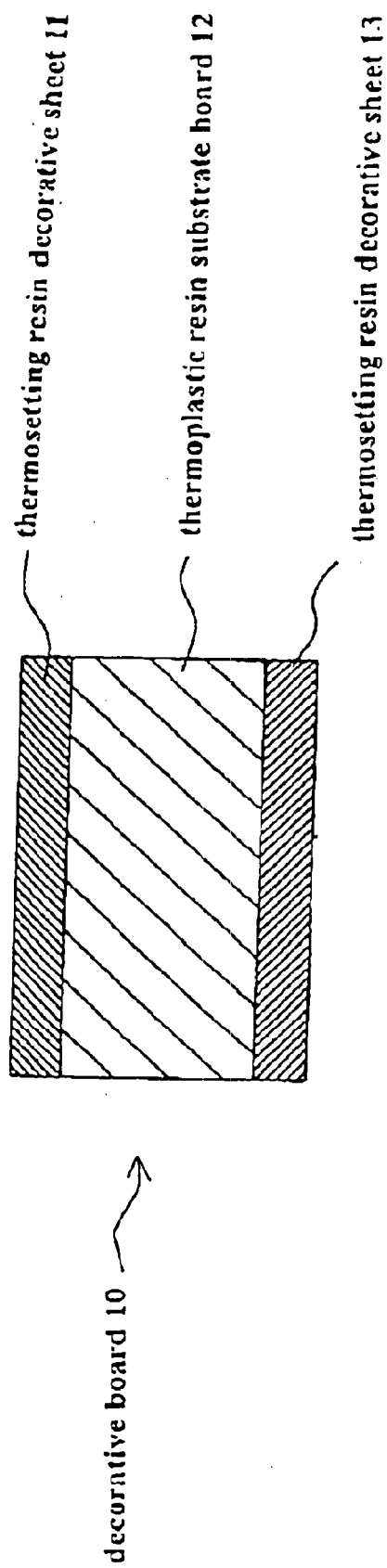
FIG. 3 is a sectional view of a decorative board according to Embodiment 1(2) of the present invention.
Figure 4:
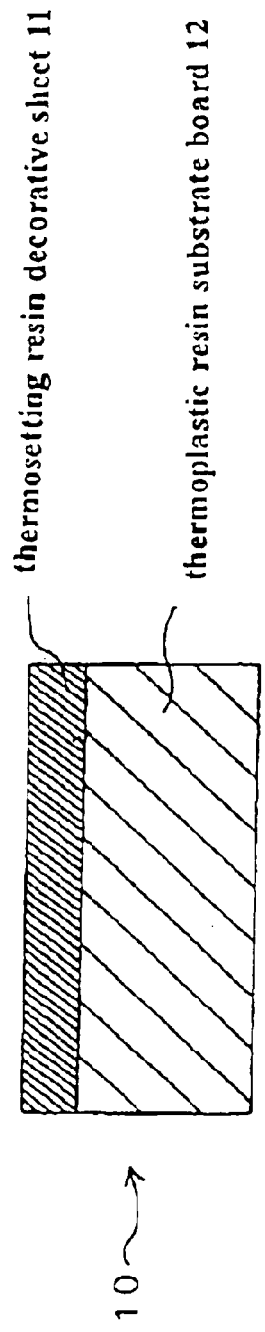
FIG. 4 is a sectional view of a decorative board according to Embodiment 1(3) of the present invention.

11 . . . thermosetting resin decorative sheet
12 . . . thermoplastic resin substrate board
13 . . . thermosetting resin decorative sheet
10 . . . decorative board
21 . . . decorative sheet
23 . . . decorative sheet
22 . . . substrate board
20 . . . decorative board
1 . . . superimposed print layers
2 . . . translucent paper sheet
6 . . . paper sheet
3 . . . synthetic resin
7 . . . synthetic resin
4 . . . resin impregnated paper sheet
5 . . . Japan paper or washi
31A . . . decorative sheet
31B . . . decorative sheet
31C . . . decorative sheet
311 . . . print layer
312 . . . print layer
313 . . . print layer
314 . . . printed portion
315 . . . non-printed portion
316 . . . pattern
9 . . . original form
90 . . . convex-concave portion
91 . . . concave portion
92 . . . convex portion
95 . . . flat portion
100 . . . decorative board

DETAILED DESCRIPTION OF PREFERRED EMBODIMENTS

The present invention is described in more detail in accordance with various embodiments of the present invention using the drawings that accompany the specification. These embodiments are to be construed as illustrating the present invention only, and not as limiting the scope of the present invention.

First of all, several embodiments which attain the "first" object of the present invention are described using FIGS. 1–4.

Embodiment 1(1)

A polypropylene resin (olefin resin) was used to provide a thermoplastic substrate board 12. Each surface of the substrate board 12 was provided with a diallylphthalate decorative sheet 11,13 as a thermosetting resin sheet, which was to be bonded to the substrate board 12 with an adhesive as follows so as to provide a decorative board 10 shown in FIG. 2.

The substrate board 12 (a product of Mitsui Kagaku Plastics), 2.0 mm thick, was treated by corona discharge means to provide good wettability (50 dyn). A translucent paper sheet (60 g/m2) which hardly contained ash was impregnated with a diallylphthalate resin (hardening catalyst: BPO: a product of Kawaguchi Yakuhin K.K.) to a rate 100 g/m2, which was thermo-compressed in a double-belt press to a 0.15 mm thick sheet. Two of such sheets 11,13 were prepared.

A polyurethane adhesive (G-5081) was applied on a surface of each of the diallylphthalate sheets 11,13. After the adhesive dried, the sheets 11,13 were respectively placed on the surfaces of the substrate board 12. The sheets 11,13 were then thermo-compressed together with the polypropylene board 12 in a heat roll at about 60° C. The sheets and the board were bonded securely together, and a decorative board 10 of the present invention was completed after two-day aging at about 40° C.

Embodiment 1 (2)

A G-PET (product name) resin board (modified polyethylene phthalate resin board: Takiron), 2.0 mm thick, was used as a thermoplastic resin substrate board 12. Each side of the board was provided with a prepreg (sheets) 11,13, which was bonded to the substrate board 12 by thermo-compression. The prepreg sheet comprised a glass fiber nonwoven fabric sheet (60 g/m2) impregnated with a diallylphthalate resin (200 g/m2). The prepregs 11,13 were bonded to the G-PET substrate board 12 by thermo-compressing (hot-cold press at 10 kg/cm2 under up to 100° C.), and a decorative board 10 was prepared.

Embodiment 1(3)

An acrylic substrate board (2.0 mm thick) was used as a thermoplastic substrate board 12, and a diallylphthalate resin was used as a thermosetting resin. The substrate board 12 was surface treated by corona discharge means to provide wettability 50 dyn. A translucent paper sheet (60 g/m2) containing no ash was impregnated with the diallylphthalate resin (BPO hardening catalyst) to a rate 100 g/m2, which was bonded to a surface of the substrate board 12 by thermo-compression at about 150° C., 18 kg/cm2 to produce a decorative board 10 having a single decorative sheet 11 (see FIG. 4).

Properties of the decorative boards 10 prepared according to Embodiments 1(1)–1(3) were studied. For comparison, conventional decorative boards were also prepared as Comparisons 1(1), 1(2) and 1(3) Table 1 shows the result of the comparison.

TABLE 1

| | Emb. 1-1 | Emb. 1-2 | Emb. 1-3 | Com. 1-1 | Com. 1-2 | Com. 1-3 |
|---|---|---|---|---|---|---|
| Top | paper + DAP | glass non-woven + DAP | paper + DAP | polypropylene | G-PET | acrylic material |
| Int. | polypropylene | G-PET | acrylic material | polypropylene | G-PET | acrylic material |
| Bottom | paper + DAP | glass non-woven + DAP | (none) | polypropylene | G-PET | acrylic material |
| Thickness | 2.5 mm | 2.2 mm | 2.25 mm | 2.0 mm | 2.0 mm | 1.5 mm |
| Hardness (surface) | 70 g | 70 g | 70 g | <10 g | <10 g | 10 g |
| Flexural Strength | 72 Mpa | 170 Mpa | 150 Mpa | 43 Mpa | 77 Mpa | 70 Mpa |
| Flexural Modulus | 3.3 Gpa | 7.3 Gpa | 3.0 Gpa | 1.4 Gpa | 2.2 Gpa | 2.0 Gpa |
| Impact Resistance | 1100 mm | 1200 mm | 1000 mm | 1200 mm | 500 mm | 500 mm |
| Workability | circle saw usable | circle saw usable | circle saw usable | circle saw usable | circle saw usable | circle saw unusable |
| Boring Performance | no cracks | no cracks | no cracks | cracks | cracks | cracks |

Comparison 1(1) used a 2.0 mm thick polypropylene board, Comparison 1(2) used a 2.0 mm thick G-PET board, and Comparison 1(3) used a 1.5 mm thick acrylic board.

The surface hardness, flexural strength, flexural modulus, and impact resistance in Table 1 were measured according to the JIS K6902 standard. The boring performances were tested using a 5 mm-diameter drill.

Embodiments 1(1), 1(2) and 1(3) provided very good surface hardness, flexural strength, flexural modulus and impact resistance, while Comparison 1(1) provided poor surface hardness, flexural strength and flexural modulus and Comparison 1(2) provided poor surface hardness, flexural strength, flexural modulus and impact resistance. Further, when Embodiments 1(1), 1(2) and 1(3) were wiped with acetone, no degradation of the surfaces was observed, while the wiping with acetone of Comparisons 1(1), 1(2) and 1(3) whitened the surfaces. The optical transmittances of Embodiments 1(1), 1(2) and 1(3) were respectively 20%, 25% and 30%. Embodiments 1(1), 1(2) and 1(3) were only about ⅓ of glass in weight (<0.8 specific gravity), while Comparison 1(3) had a specific gravity of 1.5.

As described, the surface hardness, flexural strength and flexural modulus can be excellently improved by providing a thermosetting sheet or sheets on the surfaces of a thermoplastic board. Impact resistance can also be greatly improved by adequately selecting the thermosetting resin materials. The thermoplastic resin boards were translucent (optical transmittance 10% or better), which provided fancy appearance to the finished decorative boards. It is to be noted that the translucent substrate boards 12 of those embodiment decorative boards 10 of the present invention appeared "colored" the same with the color or colors of the covering decorative sheets 11,13 as can be appreciated easily by artisans of the relevant fields.

The decorative board of Embodiment 1(3) had a thermosetting sheet only on one surface thereof, which warped 3 mm for every 1 m after left at 80° C. for an hour, while the decorative boards of Embodiments 1(1) and 1(2) having two cover sheets each did not warp practically at all and were stable, which is evidence that two thermosetting sheets are more preferable to only one sheet. However, such small warping is practically ignorable.

Figure 5:
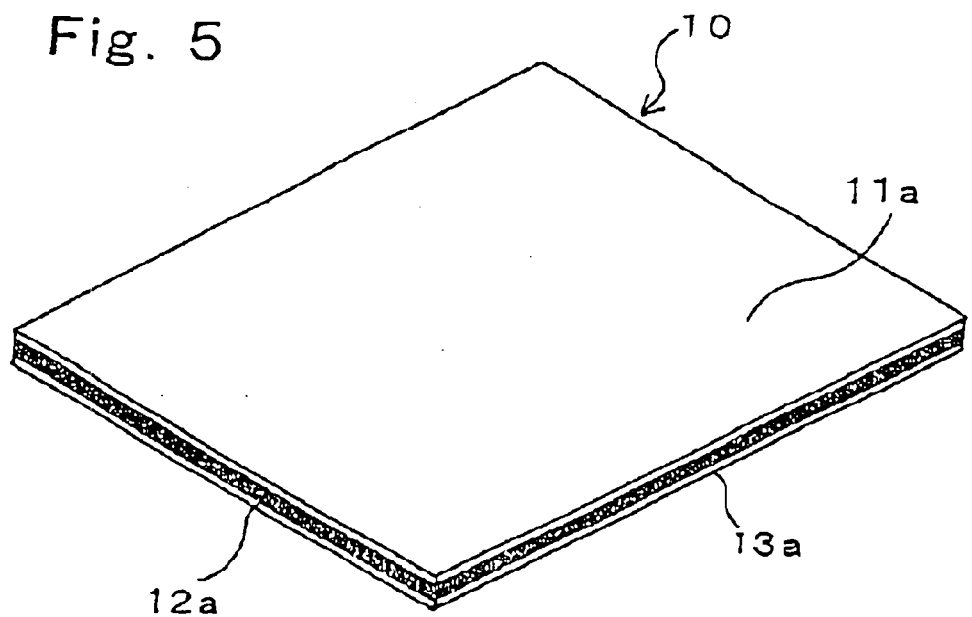
FIG. 5 is a perspective view of a decorative board according to Embodiment 1(4) of the present invention.
Figure 6:
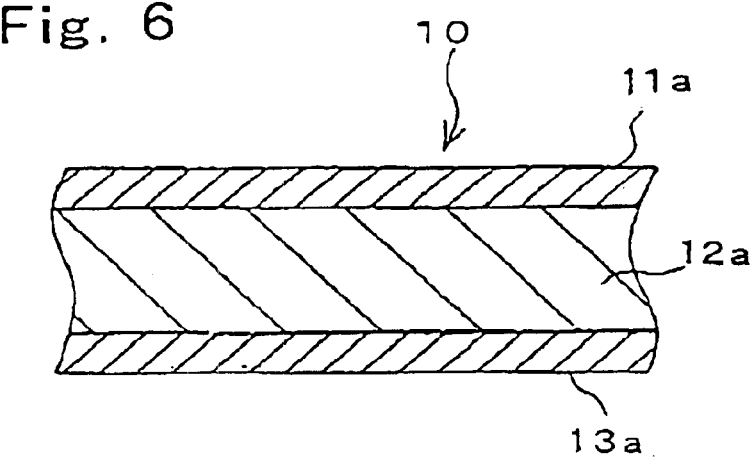
FIG. 6 is a sectional view of the decorative board of FIG. 5.

The following other embodiment decorative boards, Embodiments 1(4) and 1(5), were prepared so as to achieve the "first" object of the present invention, which are partially shown in FIGS. 5 and 6.

Embodiment 1(4)

A decorative board 10 of this embodiment comprised a thermoplastic polypropylene board 12a (olefin board) and thermosetting diallylphthalate sheets 11a,13a which were bonded to the surfaces of the polypropylene board 12a.

The decorative board 10 of this embodiment was prepared as follows. A 1.0 mm thick translucent polypropylene board 12a was surface treated by corona discharge means to provide the surfaces thereof with wettability 50 dyn. A translucent paper sheet (60 g/m2) was thermo-compression bonded (150° C., 20 kg/cm2) with a diallylphthalate resin impregnated sheet to provide a 0.15 mm thick decorative sheet. Two such diallylphthalate resin sheets 11a and 13a were prepared. A polyurethane adhesive (G-5081) was applied on the decorative sheets 11a,13a. The decorative sheets were then placed respectively on the surfaces of the polypropylene board 12a. The decorative sheets 11a,13a and the substrate board 12a were bonded together by thermo-compression to provide a decorative board 10 as shown in FIGS. 5 and 6.

Embodiment 1(5)

(1) A formaldehyde aqueous solution (37%) was blended with a melamine resin (1.7 mol/1 mol). The pH of the solution was adjusted to pH 9.0 with sodium hydroxide. The blend was then heated to about 90° C. and held for 60 min. to provide a thermoplastic melamine resin.

(2) A substrate sheet impregnated with the thermoplastic melamine resin was placed on a surface of a polyethylene board, which were thermo-compressed at 140° C., 7.85 Mpa to provide a decorative board.

Mechanical properties of the decorative boards of Embodiments 1(4) and 1(5) were studied. For comparison, Comparisons 1(4) and 1(5) were also prepared (provided below). Table 2 shows the comparison result. Embodiments 1(4) and 1(5) respectively had optical transmittances of 20% and 25%.

TABLE 2

|  | Rate of Dimensional Change | Impact Resistance | Flex Radius | Cutting Performance |
|---|---|---|---|---|
| Emb. 1 (4) | +0.1% | 1000 mm | 50 mm | easy to saw with circle saw |
| Emb. 1 (5) | +0.1% | 1200 mm | 60 mm | easy to saw with circle saw |
| Com. 1 (4) | +0.8% | 300 mm | not possible | can be sawn with circle saw |
| Com. 1 (5) | +0.3% | 300 mm | not possible | hard to saw with circle saw |

Comparison 1(4)

Nine sheets of paper where diallylphthalate resin was applied on each translucent sheet (60 g/m2) were thermo-compressed and bonded together at 150° C., 20 kg/cm2 to provide a 1.3 mm thick decorative board.

Comparison 1(5)

The decorative board of this comparison was a 1.5 mm thick acrylic board.

An additional conventional comparison board, Comparison 1(6), was also prepared, and it was found that the decorative board of Embodiment 1(6) did not provide physical properties that were comparable to those of the Embodiments 1(4) and 1(5).

Comparison 1(6)

As taught in JP Patent Laid-Open Publication No. 11-291423, a polyolefin sheet consisting of polyethylene (100 parts by weight), styrene-butadiene rubber (60 parts by weight) and calcium carbonate (25 parts by weigh) was surface treated with an urethane resin and hardened to provide a decorative board.

Two embodiment decorative boards, Embodiments 1(7) and 1(8), were additionally prepared to deepen the study of the advantageous features of the present invention.

Embodiment 1(6)

The translucent paper for the decorative cover sheet of Embodiment 1(4) was replaced by white pattern paper (kw-01u; Kojin Company, 7% ash content) and a decorative board was prepared.

Embodiment 1(7)

The translucent paper for the decorative cover sheet of Embodiment 1(4) was replaced by conceal paper (PK-130; Kojin Company, 2% ash content).

The decorative boards of Embodiments 1(6) and 1(7) had surface hardness, flexural strength, flexural modulus, impact resistance, workability and boring performance which were comparable to Embodiment 1(4). However, the optical transmittances of Embodiments 1(6) and 1(7) were respectively only 5% and 15%.

The "rate of dimensional change" as used in Table 2 was the rate of extension or difference in dimension between the measurements of the subject boards taken after the subject boards were held at 20° C., 40% RH (relative humidity) for 24 hs. and the subject boards were held at 20° C., 95% RH (relative humidity) for 24 hs. The "impact resistance" was the measurements of the maximum heights where a steel ball, 28 g, was dropped onto the subject boards without resulting in breaking or cracking of the boards. The "flex radius" was the maximum radiuses of the subject boards when forcedly wound around a cylinder (50 mm radius) without cracking. The "cutting performance" was the workability using a circle saw.

Table 2 clearly shows superiority of Embodiments 1(4) and 1(5) over Comparisons 1(4) and 1(5) practically in every aspect of the tested features. The optical transmittances of Comparison 1(6) was mere 1%. The impact resistance of Comparison 1(6) was "100 mm" and it was virtually impossible to bend the board of Comparison 1(6) without cracking the board Workability with a circle saw of Comparison 1(6) was poor.

Some of the excellent physical and appearance properties of the decorative boards according to Embodiments 1(1) to 1(7) are summarized hereunder.

(1) They provide excellent optical transmittance, as melamine layers, diallylphthalate layers or urea layers are formed on olefin boards;

(2) They provide excellent flexibility, excellent resistance against cracking and flawing, and excellent workability; and (3) They provide excellent size stability under humid atmospheres, as thermosetting layers are provided on olefin boards.

The olefin boards used in Embodiments 1(4) and 1(5) may be replaced by olefin foam boards, which are lighter and thus easier to transport and handle.

Figure 7:
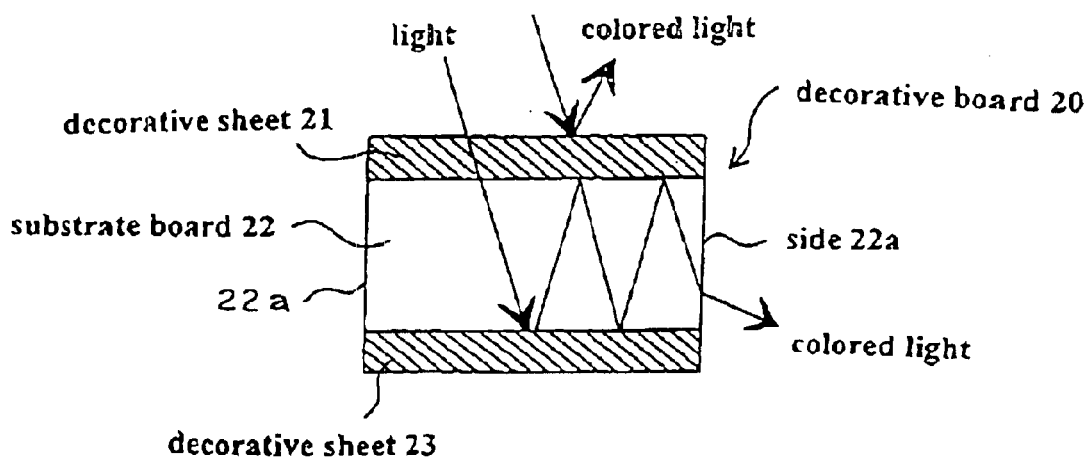
FIG. 7 is a sectional view of a decorative board according to Embodiment 2(1) of the present invention.
Figure 8:
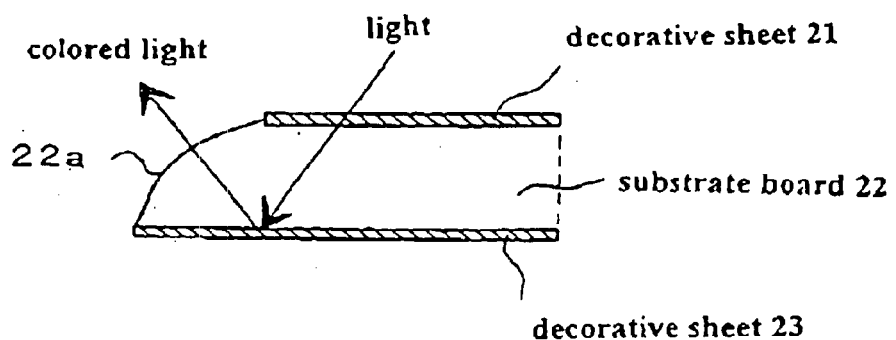
FIG. 8 is another sectional view of the decorative board of FIG. 7.

Other decorative boards were prepared in order to achieve the "second" object of the present invention, part of which are shown in FIGS. 7 and 8.

Embodiment 2(1)

Each surface of a translucent or transparent acrylic board (Mitsui Kagaku) 22 was provided with a colored translucent vinyl chloride sheet (IKC) 21,23 having an adhesive layer, which was bonded to the surface with roll press means, and a decorative board 20 was produced. The sunlight coming onto the decorative board 20 partially reflected on the surface and partially advanced into the decorative board 20, coming out of the decorative board 20 from the transparent board side 22a as shown in FIG. 7, providing an illusion that the translucent or transparent substrate board 22 was tinted the same color as the decorative colored sheets 21,23.

When a side edge of the decorative board 20 was cut or processed round as shown in FIG. 8, the round side edge 22a provided the illusion more visibly, which was an improvement over a decorative board without such a round cut edge.

Embodiment 2(2)

Colored cellophane films 21,23 were bonded on the surfaces of a 5 mm thick glass pane 22. This decorative board 20 provided the same illusionary effects as the decorative board of Embodiment 2(1).

Embodiment 2(3)

Yellow fabric substrate sheets were impregnated with a melamine resin and dried into B-stage, which were respectively placed on the surfaces of a 2.0 mm thick acrylic board 22 and bonded to the surfaces with an urethane adhesive (G-5081) to provide a yellow decorative board. This decorative board provided the same illusionary effects as the decorative boards according to Embodiments 2(1) and 2(2).

Embodiment 2(4)

A yellow glass fabric sheet and an orange glass fabric sheet were impregnated with a diallylphthalate resin (B.P.O.; Kawaguchi Yakuhin) and dried, which were bonded together by low pressure continuation press means at 10 kg/cm2, 140° C. to provide a laminate decorative sheet. Two of such laminate sheets were respectively bonded on the surfaces of a 2.0 mm thick vinyl chloride board 22 (Takiron) with an urethane adhesive (G-5081) to provide a yellow decorative board 20. This decorative board provided the same illusionary effects as Embodiments 2(1), 2(2) and 2(3).

Embodiment 2(5)

Two yellowish translucent paper sheets (60 g/m2) having identical printed patterns were impregnated with a diallylphthalate resin (hardening catalyst; B.P.O.; Kawaguchi Yakuhin), which were respectively bonded by thermo-compression means at 20 kg/cm2, 140° C. on the surfaces of a polypropylene board which had been corona discharge treated. This decorative board provided the same illusionary effects as Embodiments 2(1) to 2(4).

In order to study the advantageous features of Embodiments 2(1) to 2(5) by comparison, Comparisons 2(1),2(2) and 2(3) were also prepared as follows.

Comparison 2(1)

A decorative board was prepared according to JP Patent Publication No. 5-39187. A green pattern paper sheet (112 g/m2) containing 34.4 wt % titanic acid and bleached craft paper sheets (each 184 g/m2) containing 4.4 wt % inorganic green pigment were impregnated with a melamine resin up to 55 wt %. The pattern paper sheet and four of the craft paper sheets were bonded together at 145° C., 80 kg/cm2 to provide a decorative board (the pattern paper sheet on the top), whose top and bottom surfaces had an identical green color.

Comparison 2(2)

A colored acrylic board obtained commercially (Mitsubishi Rayon; AcryLight) was directly made into a decorative board.

The optical transmittance, impact resistance, flexural strength and surface hardness of the decorative boards of Embodiments 2(1) to 2(5) and Comparisons 2(1) and 2(2) were respectively measured in identical manners with the measurement methods set forth. Additionally, the rates of dimensional changes were measured also identically.

The optical transmittance measurements were taken against visible light. The measurements of flexural strength utilizes 3-point flexural testing. The surface hardness measurements were taken in accordance with JIS K6902. The measurement results were provided in Tables 3 and 4.

TABLE 3

| | Color | | Transmittance | | | Impact Resistance | Flexural Strength | Surface Hardness |
|---|---|---|---|---|---|---|---|---|
| | T | B | Sheet | Sub. | Board | mm | MPa | g |
| Emb. 2-1 | R | R | 51 | 88 | 35 | 400 | 100 | 10 |
| Emb. 2-2 | G | G | 75 | 90 | 50 | 500 | 90 | 12 |
| Emb. 2-3 | Y | Y | 23 | 92 | 12 | 1200 | 120 | 70 |
| Emb. 2-4 | Y | O | 36 | 84 | 20 | 1200 | 120 | 60 |
| Emb. 2-5 | P | P | 41 | — | 14 | 1200 | 50 | 60 |
| Com. 2-1 | G | G | 400 | 1.0 | 0.2 | 200 | 110 | 70 |
| Com. 2-2 | R | R | — | — | 82 | 300 | 100 | 10 |

"T" Top Surface
"B" Bottom Surface
"Sub." Substrate board
"R" Red
"G" Green
"Y" Yellow
"O" Orange
"P" Pattern
"W" White

TABLE 4

| | Rate of Dimensional Change |
|---|---|
| | % |
| Emb. 2-1 | 0.1 |
| Emb. 2-2 | 0 |
| Emb. 2-3 | 0.1 |
| Emb. 2-4 | 0.1 |
| Emb. 2-5 | 0.1 |
| Com. 2-1 | 0.6 |
| Com. 2-2 | 0.1 |

Some of the advantageous properties of Embodiments 2(1) to 2(5) are summarized below.

(1) The transparent substrate boards 22 of those embodiments provide an illusion that the transparent boards 22 are "colored" the same as the decorative sheets 21,23. Such decorative boards 20 can be manufactured easily and at low costs. They will find their advantageous use as a door panel, partition, display panels, etc.

(2) The decorative boards 20 with their side edges cut round provide an improvement in the foregoing identical color effect, and will be able to find additional advantageous uses.

(3) The decorative boards 20 will provide an illusion that the transparent substrate boards 22 are also patterned if the decorative sheets 21,23 are patterned, adding still new pleasure.

(4) The decorative boards 20 incorporating resin impregnated decorative sheets provide excellent strength, impact resistance and surface hardness.

(5) The decorative boards 20 will make excellent display decorations taking advantage of their excellent optical transmittance.

Several other embodiments of decorative boards of the present invention are described hereunder which achieve the "third" object of the present invention, which should not be construed as limiting the present invention.

Figure 9:
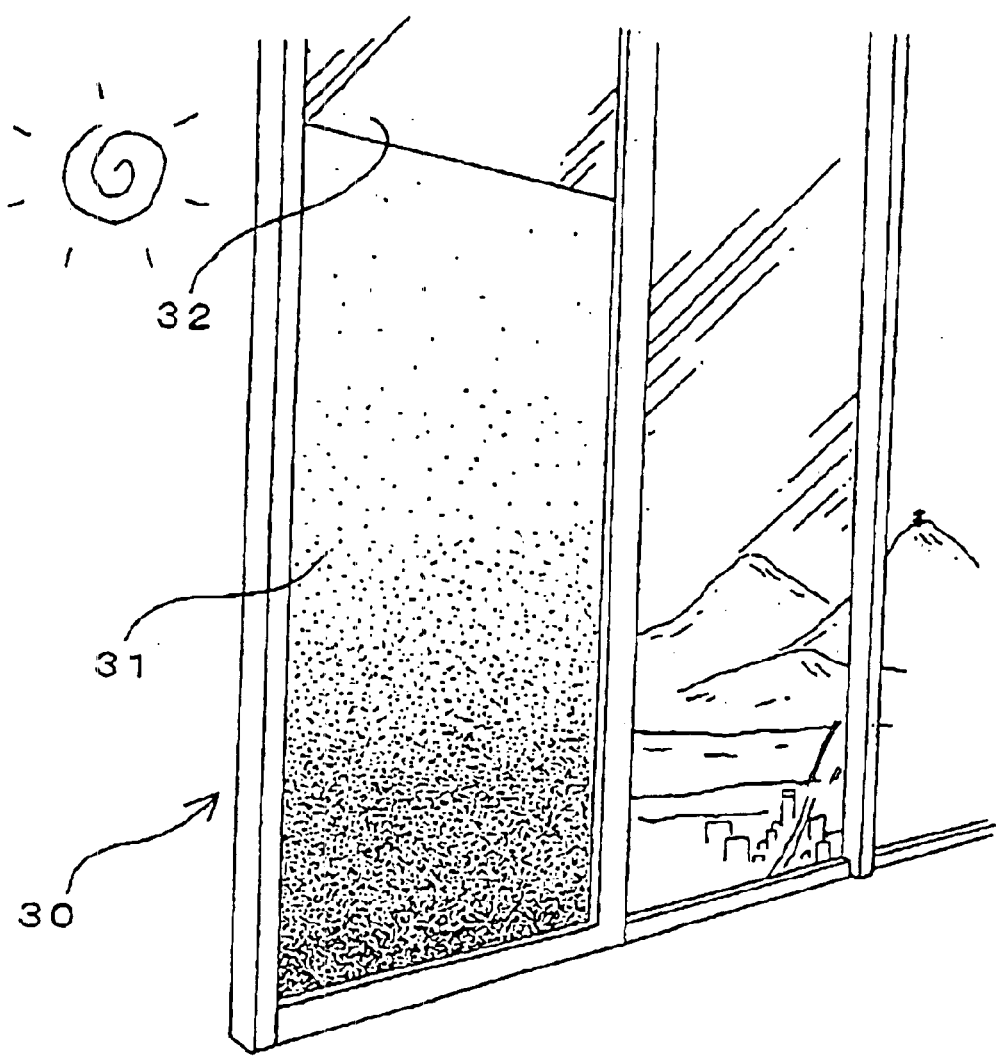
FIG. 9 is a perspective view showing a use of a decorative board according to Embodiment 3(1) of the present invention.

A decorative board 30 according to an embodiment of the present invention comprises a window glass pane 32 and a translucent decorative panel 31A bonded to the inner surface of the window pane 32 as shown in FIGS. 9 and 10. In this embodiment, a double coated adhesive tape was used to bond the glass pane 32 and the decorative panel 31A together.

As shown in FIG. 11, the decorative panel 31A comprised a translucent paper sheet 2 hardly containing ash and an integrated print layer 1. The integrated print layer 1 in this embodiment comprised a yellow layer 311, red layer 312 and black layer 313, which were partially overlapping one another and were provided on the paper sheet 2 by silk screen means. Each layer 311,312,313 comprised numerous printed dots in this embodiment.

The translucent decorative panel 31A was produced according to the following processes. The yellow dots, red dots and black dots were printed on the translucent paper sheet 2 in this order in this embodiment by silk screening to provide the integrated printed layer 1, which was impregnated with a thermosetting diallylphthalate resin (DAP) to 60 wt % to provide resin layers 3 (see FIG. 11(b)). The resin impregnated sheet 2 was then press dried at 160° C., 20 kg/cm2 to produce a translucent decorative panel 31A.

The optical transmittances of the decorative panel 31A were measured for a) the yellow dot layer, b) the yellow and red dot layers together, and c) the yellow, red and black dot layers together in accordance with JIS K-7361. The measurements provided 30% for the yellow dot layer, 20% for the yellow and red dot layers, and 5% for the yellow, red and black layers. The decorative panel 31A when applied on a window pane 32 provided a unique and charming contrasting optical appearance.

In other embodiments, the colors of the dot layers 311, 312,313 can be differently arranged using the different colors in accordance with personal tastes. The density of the dots cano be adjusted according to personal tastes.

It is preferred that the ash content in the translucent paper sheet 2 is 10 wt % or lower to provide good transparency. It is more preferred that the ash content is lower than 1 wt %. It is most preferred that the ash content is lower than 0.5 wt %. Japan paper or washi or overlay paper may be advantageously used as the translucent paper sheet 2 as they provide translucency when impregnated with a translucent resin.

The grammage of the translucent paper sheet 2 is preferred to be 5–200 g/m2. If less than that, printing on the paper sheet will become difficult. If more than that, translucency will be sacrificed. A plurality of paper sheets 2 may be used in layers to provide a translucent paper sheet 2 of the embodiments. It is preferred that no more than eight paper sheets be used so as to hold the board manufacturing costs low enough and/or not to sacrifice transparency.

The impregnating resin for the resin layers 3 is advantageously a thermosetting resin such as a diallylphthalate, melamine, epoxy or phenol resin. It is preferred that the resin 3 is impregnated in the decorative paper sheet 31A between 30 wt % and 80 wt %. Less than 30 wt % will reduce transparency and more than 80 wt % will be uneconomical.

A cover layer (not shown) such as a resin impregnated paper or polymeric layer may be applied on the outer (facing towards a room, for instance) surface of the decorative panel 31A to additionally protect the surface. The cover layer may include an abrasion resistant particles such as silica, alumina or talc particles.

Figure 12:
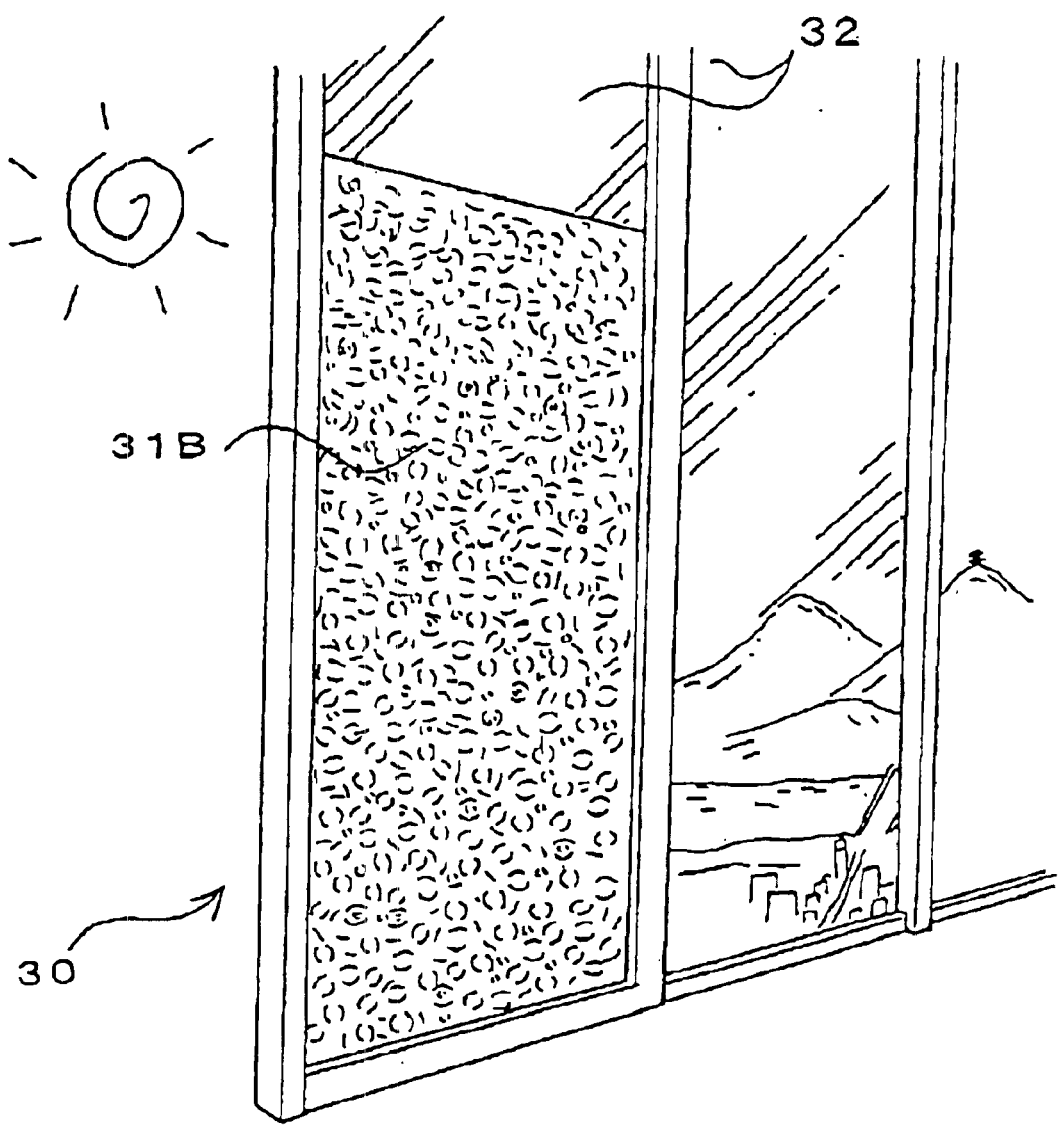
FIG. 12 is a perspective view showing a use of a decorative board according to Embodiment 3(2) of the present invention.
Figure 17:
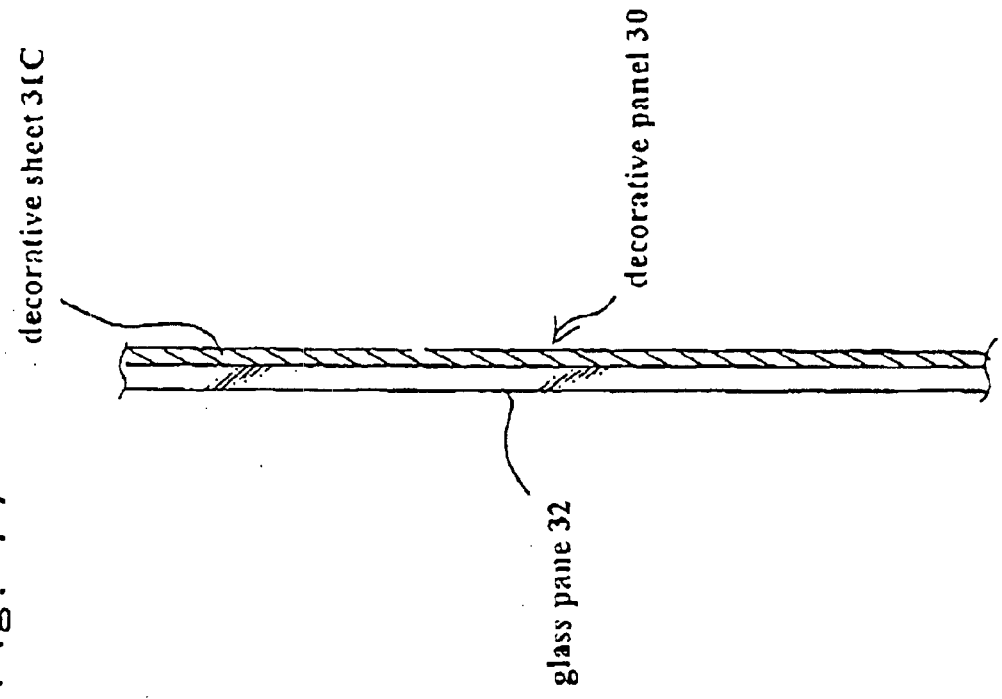
FIG. 17 is a sectional view of a decorative board according to Embodiment 3(3) of the present invention.
Figure 13:
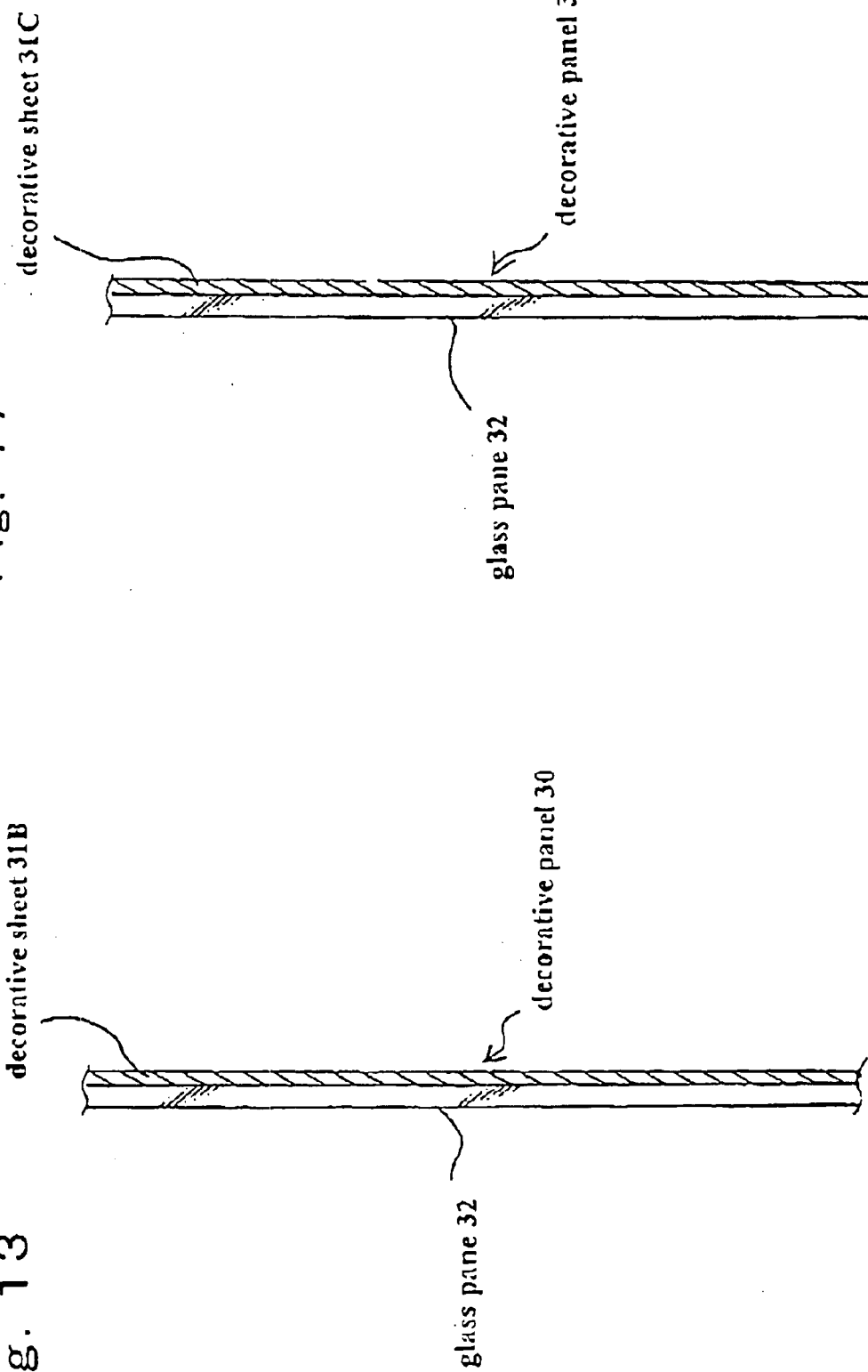
FIG. 13 is a sectional view of a decorative board according to Embodiment 3(2) of the present invention.
Figure 16:
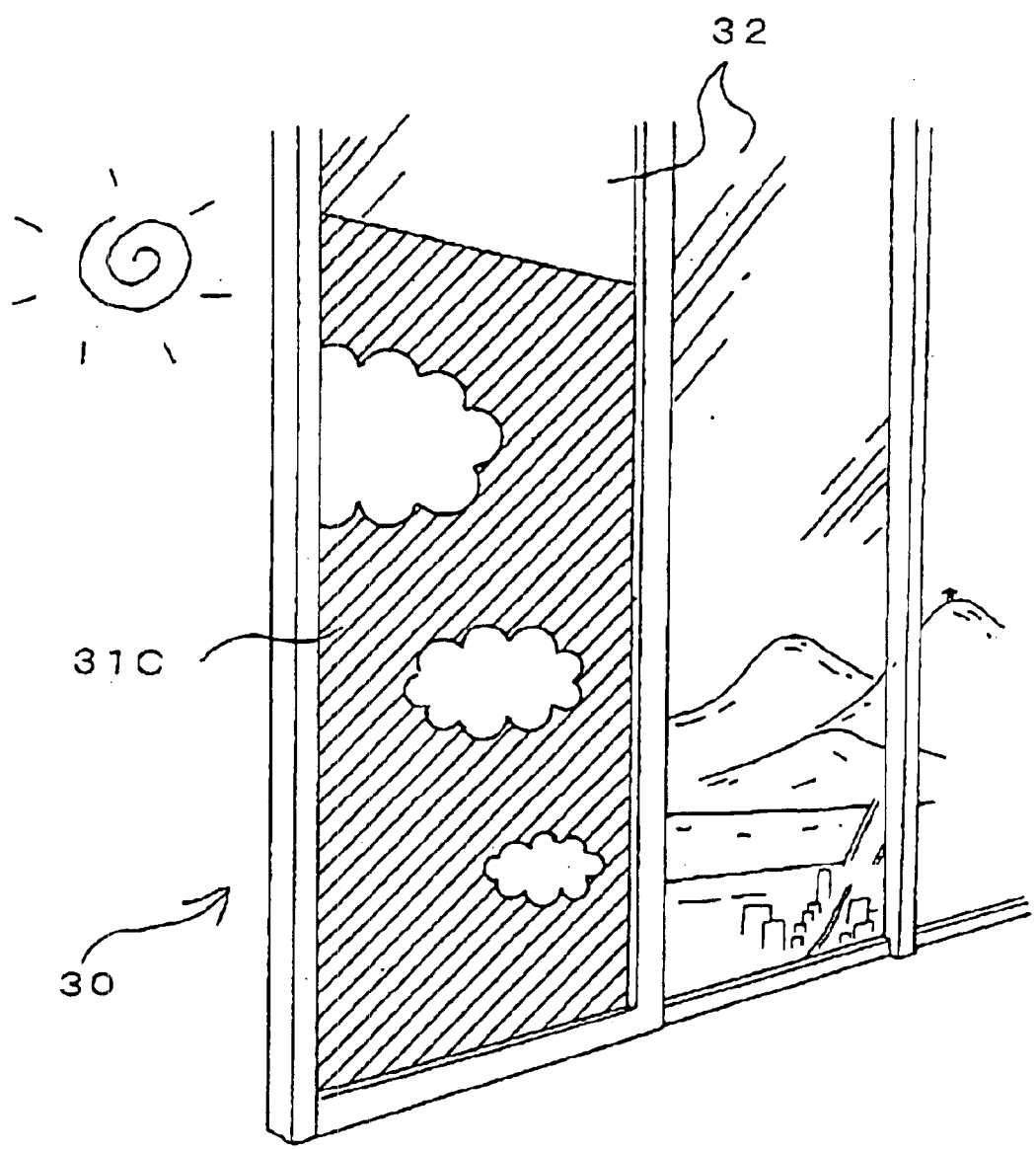
FIG. 16 is a perspective view showing a use of a decorative board according to Embodiment 3(3) of the present invention.
Figure 21:
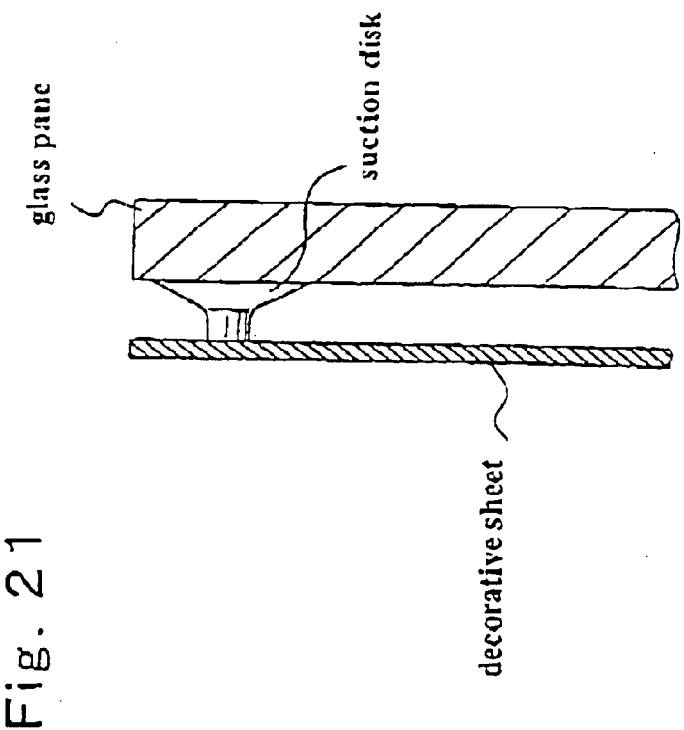
FIG. 21 is a sectional view of the decorative board of FIG. 20.

Use of the decorative board 30 is described in detail using FIGS. 12 to 15. A decorative board 30 prepared according to an embodiment for use as a window pane is shown in FIG. 12 and 13. The decorative board 30 comprised a glass pane 32 and a translucent decorative panel 31B which was bonded to the inner surface of the glass pane 32 as shown in FIG. 13. The decorative panel 31B which was translucent comprised a sheet of Japan paper 5 sandwiched by resin impregnated sheets 4 as shown in FIG. 14(a) and FIG. 14(b).

Resin impregnated sheets 4 of an embodiment were prepared by impregnating a melamine resin into sheets of paper (60 g/m2, ash contents 0.05 wt %) to 60 wt %. A sheet of Japan paper 5, which was patterned with colored fibers such as a design 33 in FIGS. 15(a) and 15(b), was placed between the resin impregnated sheets 4, which were press heated at 150° C., 80 g/cm2 for 10 min. Alternatively, the design 33 may be provided by bark chips. Still alternatively, the Japan paper may selectively include flower petals, wood chips, or colored fibers to provide unique and attractive designs. When the Japan paper 5 with such a design is impregnated with a thermosetting resin, the Japan paper 5 becomes translucent and the design comes out clearly.

It is preferred that the ash content of the resin impregnated paper sheets 4 is less than 10 wt %. Preferably, the ash content is less than 1 wt %, and most preferably it is less than 0.5 wt %. It is also possible to provide a pattern to the resin impregnated sheets 4. It is preferred that the resin content in the sheets 4 is 30 to 80 wt %. It is also preferred that the paper for the resin impregnated paper sheets 4 is 10 g/m2 to 200 g/m2. Less than 10 g/m2 will not provide adequate transparency when impregnated with a resin, while more than 200 g/m2 will lower its flexibility.

The resin to be impregnated in the resin impregnated paper sheets 4 is advantageously a thermosetting resin, such as a diallylphthalate, melamine, epoxy, or phenol resin, which provides a well integrated decorative panel when thermo-compressed and provides adequate heat resistance.

The decorative panel 31B advantageously has an optical transmittance of 10 to 90%. The Japan paper is advantageously 10–100 g/m2. The temperature to perform thermo-compression on the Japan paper and the resin impregnated paper sheets is advantageously 80–200° C. and its pressure is advantageously 10 kg/cm2–100 kg/cm2. A temperature below 80° C. may not harden the impregnated resin and a temperature over 200° C. may degrade the impregnated resin. A pressure less than 10 kg/cm2 may not provide a desired product and a pressure over 100 kg/cm2 may cause escape of the pressurized impregnated resin.

Another decorative board 30 according to another embodiment of the present invention is described hereunder using FIGS. 16–19. The decorative board 30 comprised a window glass pane 32 and a decorative panel 31C which was bonded to the inner surface of the glass pane 32. The decorative panel 31C comprised a translucent paper sheet 6 having a design 316 consisting of a printed portion 314 and non-print portions 315, and resin layers 7 sandwiching the translucent sheet 6 as shown in FIGS. 18(a) and 18(b).

The translucent paper sheet 6 (60 g/m2, ash content 0 wt %) was gravure printed the design 316 with a gravure printing machine (PD-6, Fuji Kikai Kogyo) using a negative plate 9 partially shown in FIG. 19(a) which had numerous micro protrusions 90 consisting of convex portions 92, concave portions 91 and flat portions 95.

The negative plate 9 was secured on a roll 40 schematically shown in FIG. 19(b). Ink, blue in this embodiment, was supplied onto the plate 9 from an ink supplier 41. The translucent paper sheets 6 were fed on a conveyer 42 placed below the roll 40.

The printed paper sheet 6 was impregnated with a thermosetting synthetic resin such as a diallylphthalate resin (DAP) to 60 wt %, which was thermo-compressed at 160° C., 20 kg/cm2 to produce a translucent decorative panel 31C where the design pattern 316 was clearly observed.

The optical transmittance was measured according to the JIS K-7361 standard. The printed portion 314 provided 35% while the non-print portions 315 provided 55%.

The printed portion 314 may be provided in dots or as a plane print layer. It is possible to adjust the optical transmittance of the printed portion by adjusting the amount of ink or density of the dots or plane print layer.

It is preferred that the optical transmittance of the printed portion is between 10–50%. It is preferred that the optical transmittance of the non-print portions is between 30 to 80%. It is also preferred that the difference in optical transmittance between that of the printed portion and that of the non-print portions is within the range 5 to 40%.

The decorative panel 31C may be bonded to another type of translucent substrate instead of a glass pane, including an acrylic board, vinyl chloride board, polycarbonate board, polyethylene phthalate board and olefin board.

Figure 20:
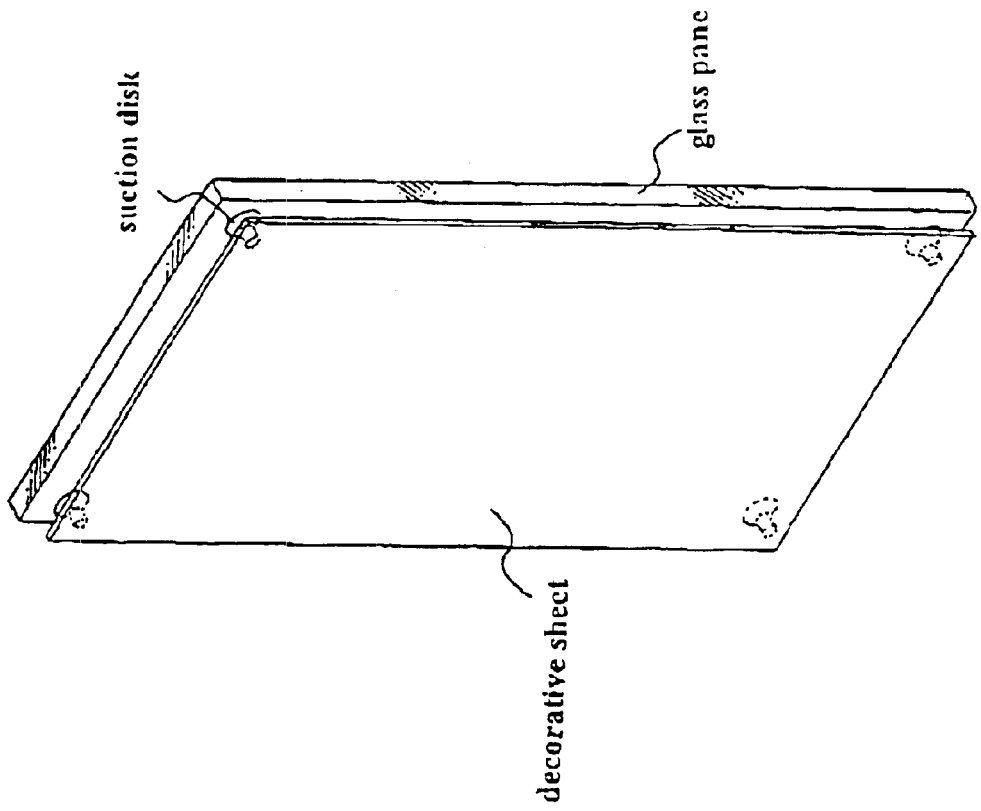
FIG. 20 is a perspective view showing another type of decorative board of the present invention.

FIG. 20 shows an embodiment of another type of the decorative board of the present invention, where the decorative panel and the substrate board are provided separately and detachably. The decorative panel is secured to the glass pane with suction disk means as illustrated in the figures.

Industrial Utilization of the Invention

The translucent decorative boards of the present invention can be advantageously used in a number and variety of ways, providing novel visionary tastes and soothing feelings to the viewers.

They can be used as a window pane, partition, decoration board, display board, door panel, etc. The decorative boards of the present invention provide excellent physical properties in addition to their appearance excellency.

Importantly, the present invention provides such attractive translucent decorative boards at very low costs.

What is claimed is:

1. A translucent decorative board comprising:

a thermoplastic substrate board; and a thermosetting resin sheet provided on a surface of the thermoplastic substrate board;

wherein the thermosetting resin sheet comprises a paper sheet containing more than 1% ash, by weight, which is impregnated and hardened with a thermosetting resin, and a woven fabric or non-woven fabric of an organic fiber.

2. The translucent decorative board of claim 1, wherein the thermoplastic substrate board comprises at least one resin selected from the resin group consisting of vinyl chloride, acrylic, polycarbonate, polyethylene phthalate and olefin resins.

3. The translucent decorative board of claim 1, wherein the thermosetting resin comprises at least one resin selected from the resin group consisting of melamine, diallylphthalate, unsaturated polyester and polyurethane resins.

4. The translucent decorative board of claim 1, wherein the woven fabric or non-woven fabric of an organic fiber is impregnated and hardened with a thermosetting resin.

5. The translucent decorative board of claim 4, wherein the thermoplastic substrate board comprises at least one resin selected from the resin group consisting of vinyl chloride, acrylic, polycarbonate, polyethylene phthalate and olefin resins.

6. The translucent decorative board of claim 4, wherein the thermosetting resin comprises at least one resin selected from the resin group consisting of melamine, diallylphthalate, unsaturated polyester and polyurethane resins.

7. The translucent decorative board of claim 4, wherein the woven or non-woven fabric of an organic fiber contains more than 1% ash, by weight.

8. The translucent decorative board of claim 7, wherein the thermoplastic substrate board comprises at least one resin selected from the resin group consisting of vinyl chloride, acrylic, polycarbonate, polyethylene phthalate and olefin resins.

9. The translucent decorative board of claim 7, wherein the thermosetting resin comprises at least one resin selected from the resin group consisting of melamine, diallylphthalate, unsaturated polyester and polyurethane resins.

* * * * *

UNITED STATES PATENT AND TRADEMARK OFFICE
CERTIFICATE OF CORRECTION

PATENT NO. : 6,846,528 B2
DATED : January 25, 2005
INVENTOR(S) : Shiro Osumi et al.

It is certified that error appears in the above-identified patent and that said Letters Patent is hereby corrected as shown below:

Column 1,
Line 44, replace "semi transparent" with -- semitransparent --.
Line 45, replace "are" with -- are: --.

Column 4,
Line 13, replace "20 m." with -- 20 mm. --.
Line 13, replace "maybe" with -- may be --.
Line 55, replace "80 g/cm2" with -- 80kg/cm2 --.

Column 16,
Lines 55 and 60, replace "7" with -- 4 --.

Signed and Sealed this

Third Day of May, 2005

JON W. DUDAS
*Director of the United States Patent and Trademark Office*